(12) United States Patent
Marple (10) Patent No.: US 8,460,824 B2
(45) Date of Patent: Jun. 11, 2013

(54) LITHIUM-IRON DISULFIDE CELL DESIGN

(75) Inventor: Jack W Marple, Avon, OH (US)

(73) Assignee: Eveready Battery Company, Inc., St. Louis, MO (US)

( * ) Notice: Subject to any disclaimer, the term of this patent is extended or adjusted under 35 U.S.C. 154(b) by 789 days.

(21) Appl. No.: 12/253,516

(22) Filed: Oct. 17, 2008

(65) Prior Publication Data

US 2009/0104520 A1  Apr. 23, 2009

Related U.S. Application Data (60) Provisional application No. 60/981,125, filed on Oct. 19, 2007.

(51) Int. Cl.
| | |
|---|---|
| *H01M 4/136* | (2010.01) |
| *H01M 4/58* | (2010.01) |
| *H01M 4/62* | (2006.01) |
| *H01M 6/16* | (2006.01) |

(52) U.S. Cl.
USPC ............ 429/221; 429/164; 429/232; 429/329

(58) Field of Classification Search
None
See application file for complete search history.

(56) References Cited

U.S. PATENT DOCUMENTS

| | | |
|---|---|---|
| 345,123 A | 7/1886 | Dana et al. |
| 4,163,829 A | 8/1979 | Kronenberg |
| 4,279,972 A | 7/1981 | Moses |
| 4,379,815 A | 4/1983 | Bubnick |
| 4,401,735 A | 8/1983 | Moses et al. |
| 4,450,214 A | 5/1984 | Davis |
| 4,481,267 A | 11/1984 | Bowden et al. |
| 4,489,144 A | 12/1984 | Clark |
| 4,526,846 A | 7/1985 | Kearney et al. |
| 4,808,497 A | 2/1989 | Blomgren et al. |
| 4,891,283 A | 1/1990 | Bowden et al. |
| 4,952,330 A | 8/1990 | Leger et al. |
| 5,158,722 A | 10/1992 | Ilic et al. |
| 5,176,968 A | 1/1993 | Blasi et al. |
| 5,219,683 A | 6/1993 | Webber |
| 5,229,227 A | 7/1993 | Webber |
| 5,290,414 A | 3/1994 | Marple |
| 5,432,030 A | 7/1995 | Vourlis |
| 5,514,491 A | 5/1996 | Webber |
| 5,571,640 A | 11/1996 | Takeuchi et al. |
| 5,595,841 A | 1/1997 | Suzuki |
| 5,691,083 A | 11/1997 | Bolster |
| 6,027,835 A | 2/2000 | Fukumura et al. |
| 6,218,054 B1 | 4/2001 | Webber |

(Continued)

FOREIGN PATENT DOCUMENTS

| | | |
|---|---|---|
| CN | 1564370 A | 1/2005 |
| EP | 1296389 A1 | 3/2003 |

(Continued)

OTHER PUBLICATIONS

Machine translation of CN 1564370, Jan. 2005.*

(Continued)

*Primary Examiner* — Jonathan Crepeau
(74) *Attorney, Agent, or Firm* — Eveready Battery Company, Inc (57) ABSTRACT

The invention relates to electrochemical cells having a jelly-roll electrode assembly that includes a lithium-based negative electrode, a positive electrode with a coating comprising greater than about 94 wt. % of iron disulfide.

6 Claims, 2 Drawing Sheets

U.S. PATENT DOCUMENTS

| | | |
|---|---|---|
| 6,602,593 B1 | 8/2003 | Callahan et al. |
| 6,730,136 B2 | 5/2004 | Webber |
| 6,849,360 B2 | 2/2005 | Marple |
| 7,157,185 B2 | 1/2007 | Marple |
| 2002/0064706 A1 | 5/2002 | Zhang et al. |
| 2003/0070283 A1 | 4/2003 | Webber |
| 2003/0113622 A1 | 6/2003 | Blasi et al. |
| 2003/0228518 A1 | 12/2003 | Marple |
| 2004/0265700 A1 | 12/2004 | Ugawa et al. |
| 2005/0112462 A1 | 5/2005 | Marple |
| 2005/0112467 A1 | 5/2005 | Berkowitz et al. |
| 2005/0202320 A1 | 9/2005 | Totir et al. |
| 2005/0233214 A1 | 10/2005 | Marple et al. |
| 2005/0244706 A1 | 11/2005 | Wu et al. |
| 2005/0277023 A1 | 12/2005 | Marple et al. |
| 2006/0008701 A1 | 1/2006 | Kim et al. |
| 2006/0046152 A1 | 3/2006 | Webber |
| 2006/0046153 A1 | 3/2006 | Webber |
| 2006/0046154 A1 | 3/2006 | Webber |
| 2007/0202409 A1 | 8/2007 | Yamakawa et al. |
| 2007/0275298 A1 | 11/2007 | Igoris et al. |
| 2008/0026288 A1 | 1/2008 | Marple |
| 2008/0050653 A1 | 2/2008 | Berkowitz et al. |
| 2008/0050654 A1 | 2/2008 | Stevanovic |
| 2008/0254343 A1 | 10/2008 | Kaplin et al. |
| 2009/0191460 A1 | 7/2009 | Fujiwara |

FOREIGN PATENT DOCUMENTS

| | | |
|---|---|---|
| JP | 04-012471 A | 1/1992 |
| JP | 04-109551 A | 10/1992 |
| JP | 06-177255 A | 6/1994 |
| JP | 10-12220 A | 1/1998 |
| JP | 11-265707 A | 9/1999 |
| JP | 2005123183 A | 5/2005 |
| JP | 2007-080791 A | 3/2007 |
| WO | 03105255 A2 | 12/2003 |

OTHER PUBLICATIONS

U.S. Appl. No. 10/675,512, filed Sep. 30, 2003.
U.S. Appl. No. 11/313,509, filed Dec. 31, 2005.
U.S. Appl. No. 11/508,672, filed Aug. 23, 2006.
U.S. Appl. No. 11/508,680, filed Aug. 23, 2006.
Ishikawa, et al., "In Situ Scanning Vibrating Electrode Technique for the Characterization of Interface Between Lithium Electrode and Electrolytes Containing Additives", Electrochemical Society Letters, V. 141, p. L159-L161, 1994.
Ishikawa, et al., "Pretreatment of Li metal anode with electrolyte additive for enhancing Li cycleability", Journal of Power Sources, V. 146, p. 199-203, 2005.
Linden, David. Handbook of Batteries, Ch. 11, 1995.
Linden, David. Handbook of Batteries, Table of Contents, 1995.
Strauss E., et al. "To the electrochemistry of pyrite in Li/solid composite-polymer-electrolyte battery", Journal of Power Sources, vol. 115, No. 2. Apr. 10, 2003, pp. 323-331.
Patent Cooperation Treaty (PCT), International Search Report and Written Opinion for Application No. PCT/US2008/011851, filed Oct. 17, 2008, mailed Dec. 3, 2010, European Patent Office, Netherlands.

* cited by examiner

LITHIUM-IRON DISULFIDE CELL DESIGN

FIELD OF INVENTION

The invention relates to primary electrochemical cells having a jellyroll electrode assembly that includes a lithium-based negative electrode, a positive electrode with a coating comprising iron disulfide deposited on a current collector and a polymeric separator. More particularly, the invention relates to an improved cell design which optimizes electrochemically active materials and internal cell voids as compared to container strength, thereby improving cell capacity without determinately affecting safety or reliability.

BACKGROUND

Electrochemical cells are presently the preferred method of providing cost effective portable power for a wide variety of consumer devices. The consumer device market dictates that only a handful of standardized cell sizes (e.g., AA or AAA) and specific nominal voltages (typically 1.5 V) be provided. Moreover, more and more consumer electronic devices, such as digital still cameras, are being designed with relatively high power operating requirements. As has been the practice within the market, consumers often prefer and opt to use primary batteries for their convenience, reliability and sustained shelf life as compared to comparable, currently available rechargeable (i.e., secondary) batteries.

Within this context, it is readily apparent that design choices for primary (i.e., non-rechargeable) battery manufacturers are extremely limited. For example, the necessity of using specified nominal voltages significantly limits the selection of potential electrochemical materials, and the use of standardized cell sizes restricts the overall available internal volume available for active materials, safety devices and other elements typically expected in such consumer products. What's more, the variety of consumer devices and the range of operating voltages for those devices make smaller nominal voltage cells (which can be provided separately or in series, thereby giving device makers more design options) advantageous to higher voltage electrochemical pairings. Thus, 1.5 V systems, such as alkaline or lithium-iron disulfide systems, are far more prominent than others, such as 3.0 V and higher lithium-manganese dioxide. Correspondingly, the design considerations for each electrochemical systems (e.g., alkaline v. lithium-iron disulfide, etc.) are all significantly different.

Within the realm of 1.5 V systems, lithium-iron disulfide batteries (also referred to as $LiFeS_2$, lithium pyrite or lithium iron pyrite) offer higher energy density, especially at high drain rates, as compared to alkaline, carbon zinc or other systems. However, current regulatory limitations on the amount of lithium in primary batteries make the FR03 (AAA $LiFeS_2$ cells) and FR6 (AA $LiFeS_2$ cells) sizes especially significant within the consumer market.

Other dissimilarities between lithium-iron disulfide and other chemical systems create other differences in the respective designs for such batteries. For example, alkaline and nickel oxy-hydroxide systems rely on an aqueous and highly caustic electrolyte that has a propensity for leakage, leading to very different approaches in terms of selection of internal materials and/or compatibility with containers and closures. In rechargeable 1.5 V systems (which do not include lithium-iron disulfide systems), various highly specialized electrochemical and/or electrolyte compositions may be used. Here, such high cost components are not a key design concern because secondary systems typically sell for a higher retail price than their primary battery equivalents. Moreover, the discharge mechanisms, cell designs and safety considerations are, by and large, inapplicable to primary systems.

But even with the inherent advantages of lithium-iron disulfide cells for high power devices (as compared to primary alkaline cells), $LiFeS_2$ cell designs must still strike a balance between the cost of materials used, the incorporation of necessary safety devices and the overall reliability, delivered capacity and intended use of the designed cell. Normally, low power designs emphasize the quantity of active materials, while high power designs focus more on configurations to enhance discharge efficiency. For example, a jellyroll design which maximizes surface area between the electrodes allows for greater discharge efficiencies but sacrifices capacity on low power and low rate discharges because such a design necessitates utilization of more inactive materials, such as separator and current collector(s) (both which occupy internal volume, thereby requiring removal of active materials from the cell design).

Notwithstanding the desire to improve discharge capacity, cell designers must also include and improve other battery characteristics, such as safety and reliability. Safety devices normally include venting mechanisms and thermally activated "shutdown" elements, such as positive thermal circuits (PTCs). Improvements to reliability primarily focus on preventing internal short circuits. In both instances, these characteristics ultimately require elements that occupy internal volume and/or design considerations that are usually counterproductive to cell internal resistance, efficiency and discharge capacity. Moreover, there are additional challenges because transportation regulations limit the percent amount of weight lithium batteries can lose during thermal cycling, meaning that cell designs for smaller container sizes like AA and AAA can only lose milligrams of total cell weight (usually by way of evaporation of the electrolyte). Plus, the reactive and volatile nature of the non-aqueous, organic electrolyte severely limits the universe of potential materials available (particularly with respect to interactions between the electrolyte and cell closure, separator and/or current collector(s) provided within the cell) as compared to other electrochemical systems.

Ultimately, maximizing the amounts of active materials in lithium-iron disulfide batteries may be the most difficult challenge. The basic, final electrochemical reaction for such cells is:

$$4Li + FeS_2 \rightarrow 2Li_2S + Fe$$

Because the reaction end products occupy more volume than the inputs, the electrode assembly swells as the battery discharges. In turn, swelling creates radial forces that can cause unwanted bulging of the cell container, as well as short circuits if the separator is compromised. Previous means of handling these problems include using strong (often thicker) materials for the cell housing and inactive components within the cell. However, thicker inactive materials limit the internal volume available and thicker, more rugged electrodes are not necessarily desirable in terms of performance because they allow for fewer winds possible in the jellyroll, resulting in less surface area between the electrodes and the potential for comparatively lower performance at higher drain rates.

A number of other approaches have been taken to strike an appropriate balance between optimal internal volume utilization and acceptable $LiFeS_2$ cell capacity/performance. For example, a possible solution for problems created by swelling, disclosed in U.S. Pat. No. 4,379,815, is to balance cathode expansion and anode contraction by mixing one or more other active materials (such as CuO, $Bi_2O_3$, $Pb_2Bi_2O_5$, $P_3O_4$, CoS$_2$) with pyrite, although these additional materials can negatively affect the discharge characteristics of the cell, and the capacity and efficiency of the overall cell may also suffer.

Other means of improving discharge capacity in LiFeS$_2$ cell contemplate the use of thinner separators and/or specific cathode coating mixes and coating techniques, as disclosed in U.S. Patent Publication Nos. 2005/0112462, filed on Nov. 21, 2003, and 2005/0233214, filed on Dec. 22, 2004, both conceived by the current inventor. Notably, as suggested by FIG. 2 of the '462 Publication, failure of the separator's physical integrity, which is dependent upon the tensile strength in both the web and cross web direction, and a resulting loss of a battery's capacity/utility occurs as the designed amount of electrode void volume decreases (expressed there as a function of jellyroll cross sectional void).

Also, U.S. Pat. Nos. 6,849,360 and 7,157,185 contemplate the use of a specific cathode coating formulation in combination with a set ratio of anode to cathode interfacial active materials (i.e., the theoretical interfacial input capacity ratio) in order to enhance cell performance.

SUMMARY OF INVENTION

The invention as described herein provides an electrochemical cell with improved energy density and without compromising safety or reliability baselines established in previous designs. Separator tensile strength, container strength, jellyroll radial expansion and internal void volume of the cell are all maximized to create a battery with superior service for FR6, FR03 and other lithium-iron disulfide cylindrical battery sizes relying on a jellyroll electrode assembly. Those skilled in the art may realize additional or alternative advantages by referring to the claims, drawings and additional description provided herein.

Accordingly, one aspect of the present invention contemplates a battery with a lithium anode, a separator, and a cathode wound into a jellyroll assembly. The cathode comprises greater than a current collector and a coating. The coating has a dry mix density, excluding the current collector of at least 4.4 g/cm$^3$ and the jellyroll assembly exerts no more than between 50-80% of the container's yield strength during discharge of the battery when radial forces are expected to be at their maximum (e.g., see FIG. 1). Alternatively, the coating may have 95-98 wt. % of FeS$_2$ and 2-5 wt. % of inactive materials, with the weight percentages expressed as a function of the total weight of the dried coating, and an energy densities for FR6 batteries that are greater than 270 Wh/kg at a constant power of 1000 mW or greater than about 315 Wh/kg at a constant current of 200 mA. FR03 batteries according to the invention exhibit a capacity of at least 1950 mA and an energy density of at least 260 Wh/kg, both at continuous 100 mA discharge to a 1.0 V cutoff.

Lastly, methods of making a FR6 battery with at least 4 Wh of capacity on a 1000 mW constant power drain and an FR03 battery with at least 1950 mAh of capacity at 100 mA continuous drain, both to a 1.0 V cutoff, are contemplated. The method involves selecting a container having a size appropriate for the battery; determining an amount of FeS$_2$ necessary to insure that, when the cell is fully discharged, radial force of expansion is between 50% and 80% of the yield strength of the container; providing FeS$_2$ in the determined amount to a slurry mixture and coating the slurry mixture onto a metallic foil current collector; then forming a jellyroll electrode assembly by winding the coated current collector with a separator and an anode strip consisting essentially of lithium or a lithium alloy; and placing the jellyroll electrode assembly within the cylindrical container and closing the container. Note that the slurry mixture has greater than 94 wt. % of FeS$_2$ as compared to the total weight of solids provided to said slurry mixture.

Notably, throughout this specification, it should be understood that capacity is not only a useful metric for battery consumers, but improvements to capacity also represent a fundamentally sound battery design. That is, in order to deliver greater capacity, careful consideration must given for the radial expansion forces and other dynamics at work in a discharging lithium-iron disulfide battery. If the design provides inadequate thickness in the current collector, for example, then the radial forces during discharge may compress the collector until it disconnects. Once this disconnect occurs, the battery may cease to deliver capacity regardless of whether the active materials have all been discharged. Similar situations arise with respect to the robustness of the jellyroll design, the void volume in the coating and in the container as a whole, the electrical connections throughout the battery, the venting mechanism for the battery and any number of other design criteria. Therefore, capacities cited herein act as a proxy for the overall robustness of the design. What's more, the capacities delivered by the batteries according to this invention represent significant increases as compared to the prior art—a result which is not easily achieved or expected when one considers that the dimensions for FR6 and FR03 batteries cannot change. Stated differently, to achieve any increase in capacity, a multitude of design choices must be made beyond simply opting to add more active material in such standard sized batteries.

DESCRIPTION OF A PREFERRED EMBODIMENT OF THE INVENTION

Unless otherwise specified, as used herein the terms listed below are defined and used throughout this disclosure as follows:

capacity—the capacity delivered by a single electrode or an entire cell during discharge at a specified set of conditions (e.g., drain rate, temperature, etc.); typically expressed in milliamp-hours (mAh) or milliwatt-hours (mWh) or by the number of images taken under a digital still camera test;

specific energy density—the capacity of the cell or battery divided by the total weight of the entire cell or battery generally expressed in watt-hours/kilogram (Wh/kg) or milliwatt-hours/gram (mWh/g);

digital still camera test—a camera takes two pictures (images) every minute until the battery life is exhausted, following the testing procedure outlined in ANSI C18.3M, Part 1-2005 published by the American National Standard for Portable Lithium Primary Cells and Batteries—General and Specifications and entitled, "Battery Specification 15LF (AA lithium iron disulfide), Digital camera test". This test consists of discharging a AA sized lithium iron disulfide battery at 1500 mW for 2 seconds followed by 650 mW for 28 second, with this 30 second cycle repeated for a total cycle of 5 minutes (10 cycles) and followed by a rest period (i.e., 0 mW) for 55 minutes. The entire hourly cycle 24 hours per day until a final 1.05 voltage or less is recorded. Each 30 second cycle is intended to represent one digital still camera image.

theoretical input capacity—the capacity of the electrochemical material(s) in a single electrode or an entire cell based upon the theoretically available electrochemical capacity of the material comprising the electrode/cell; may be calculated by multiplying the weight of each active material in the electrode by the theoretical specific capacity of that active material, with theoretical specific capacity of each active material determined by: [(96,487 ampere–seconds/mole)/(number of grams/mole of active material)]×(number of electrons/mole of active material)/(3600 seconds/hour)×(1000 milliampere hours/ampere-hour); Table 1 lists exemplary theoretical input capacities calculated according to this formula:

TABLE 1

Theoretical Input Capacities for Selected Materials.

| Material | Theoretical Input Capacity (mAh/g) |
|---|---|
| Li | 3862 |
| S | 1672 |
| $FeS_2$ | 893.6 |
| $CF_x$ | 864.3 |
| CuO | 673.8 |
| CuS | 560.7 |
| $MnO_2$ | 308.3 |
| $FeCuS_2$ | 292.1 | theoretical interfacial input capacity—the capacity of an electrode or an entire cell based on the overall cell discharge reaction mechanism(s) and the total amount of active material contained within the portion of the active material mixture adjacent to active material in the opposite electrode, assuming complete reaction of all of the active material; if only one of the two major surfaces of an electrode strip is adjacent active material in the opposite electrode, only the active material on that side of the electrode—either the material on that side of a solid current collector sheet or that material in half the thickness of an electrode without a solid current collector sheet—is included in the determination of interfacial capacity;

anode—the negative electrode; more specifically, within the meaning of the invention, it consists essentially of lithium or an alloy containing at least 90% lithium by weight as the primary electrochemically active material;

cathode—the positive electrode; more specifically, within the meaning of the invention, it comprises iron disulfide as the primary electrochemically active material, along with one or more rheological, polymeric and/or conductive additives, coated onto a metallic current collector;

cathode dry mix density—refers to the additive density of the solid components of the cathode coating, but does not include the density of the current collector;

"jellyroll" or "spirally wound" electrode assembly—strips of anode and cathode, along with an appropriate polymeric separator, are combined into an assembly by winding along their lengths or widths, e.g., around a mandrel or central core;

cell housing—the structure that physically encloses the electrochemically active materials, safety devices and other inert components which comprise a fully functioning battery; typically consists of a container (formed in the shape of a cup, also referred to as a "can") and a closure (fitting over the opening of the container, typically consists of venting and sealing mechanisms for impeding electrolyte egress and moisture/atmospheric ingress); depending upon the context may sometimes be used interchangeably with the terms can or container;

cylindrical cell size—any cell housing having a generally cylindrical shape where the height of the cylinder is greater than the diameter of the cylinder so as to specifically exclude any button cells, miniature cells or experimental "hockey puck" cells;

electrode assembly interfacial height/area—as appropriate, the length or area of the jellyroll electrode assembly wherein the anode, cathode and separator are all aligned so as to allow for an electrochemical reaction (for example, the electrode assembly interfacial height in a cylindrically shaped jellyroll electrode assembly would be determined by the longitudinal axis along all points where the anode, cathode and separator are perpendicularly adjacent to one another on that axis);

void volume—the volume of the solids of a particular feature subtracted from the total available volume of that feature;

average particle size—the mean diameter of the volume distribution of a sample of a composition;

electrode loading—total material mixture dry weight per unit of electrode surface area, generally expressed in grams per square centimeter ($g/cm^2$);

electrode packing—total material dry weight per unit of electrode surface area divided by the theoretical active material mixture dry weight per unit of electrode surface area, based on the real densities of the solid materials in the mixture, generally expressed as a percentage;

electrochemically active material—one or more chemical compounds that are part of the discharge reaction of a cell and contribute to the cell discharge capacity, including impurities and small amounts of other moieties present;

nominal—a value, specified by the manufacturer, that is representative of what can be expected for that characteristic or property; and ambient temperature or room temperature—between about 20° C. and about 25° C.; unless otherwise stated, all examples, data and other performance and manufacturing information were conducted at ambient temperature.

It will be understood by those who are skilled in the art of lithium-iron disulfide batteries that various substitutions and/or modifications may be possible without departing from the principles of invention disclosed herein.

Figure 1:
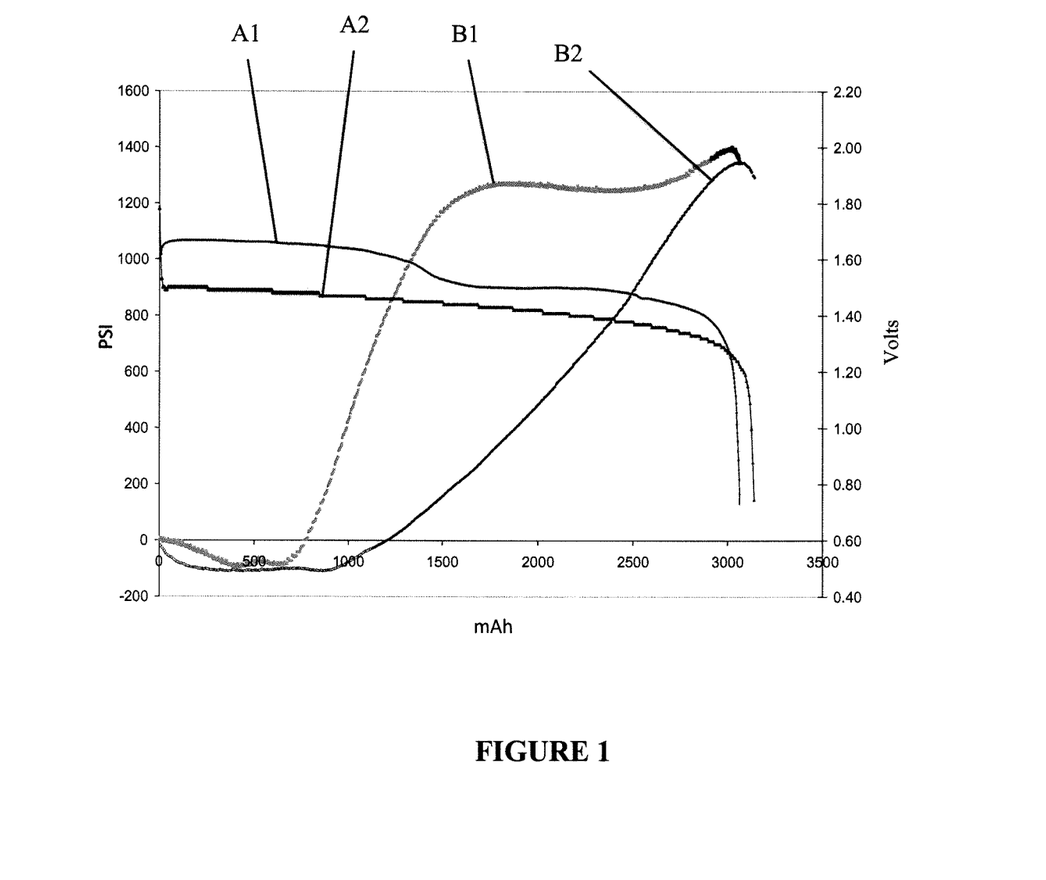
FIG. 1 illustrates the relationship between discharge curve (expressed in volts along the right hand axis) and radial expansion the jellyroll (expressed in pounds per square inch of pressure exerted upon a 10 mil stainless steel cylindrical container) at varying drain rates as compared to the overall capacity of a commercially available lithium-iron disulfide AA-sized battery.
Figure 2:
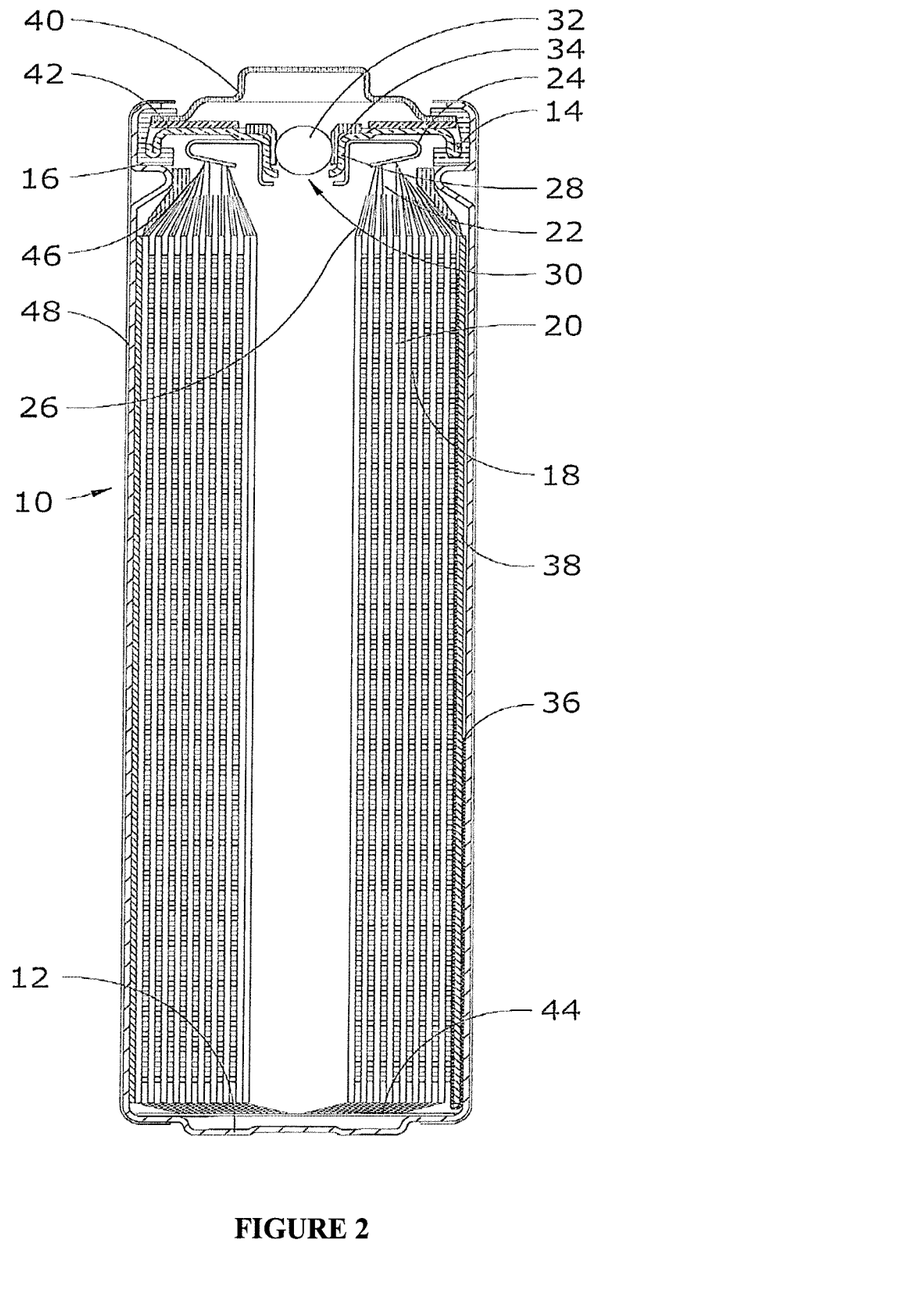
FIG. 2 is a longitudinal cross sectional view of one embodiment of an electrochemical battery cell with a lead disposed between the side of the container wall and the external surface of the container for making electrical contact between the container and a cell electrode.

The invention will be better understood with reference to FIGS. 1 and 2. In FIG. 2, the cell 10 is one embodiment of a FR6 (AA) type cylindrical Li/FeS2 battery cell, although the invention should have equal applicability to FR03 (AAA) or other cylindrical cells. The cell 10 has, in one embodiment, a housing that includes a container in the form of a can 12 with a closed bottom and an open top end that is closed with a cell cover 14 and a gasket 16. The can 12 has a bead or reduced diameter step near the top end to support the gasket 16 and cover 14. The gasket 16 is compressed between the can 12 and the cover 14 to seal an anode or negative electrode 18, a cathode or positive electrode 20 and electrolyte within the cell 10.

In one embodiment, the anode 18, cathode 20 and a separator 26 are spirally wound together into an electrode assembly. The cathode 20 has a metal current collector 22, which extends from the top end of the electrode assembly and is connected to the inner surface of the cover 14 with a contact spring 24. The anode 18 is electrically connected to the inner surface of the can 12 by a metal lead (or tab) 36. The lead 36 is fastened to the anode 18, extends from the bottom of the electrode assembly, and is folded across the bottom and up along the side of the electrode assembly. The lead 36 makes pressure contact with the inner surface of the side wall of the can 12. After the electrode assembly is wound, it can be held together before insertion by tooling in the manufacturing process, or the outer end of material (e.g., separator or polymer film outer wrap 38) can be fastened down, by heat sealing, gluing or taping, for example.

In one embodiment, an insulating cone 46 is located around the peripheral portion of the top of the electrode assembly to prevent the cathode current collector 22 from making contact with the can 12, and contact between the bottom edge of the cathode 20 and the bottom of the can 12 is prevented by the inward-folded extension of the separator 26 and an electrically insulating bottom disc 44 positioned in the bottom of the can 12.

In one embodiment, the cell 10 has a separate positive terminal cover 40, which is held in place by the inwardly crimped top edge of the can 12 and the gasket 16 and has one or more vent apertures (not shown). The can 12 serves as the negative contact terminal. An insulating jacket, such as an adhesive label 48, can be applied to the side wall of the can 12.

In one embodiment, disposed between the peripheral flange of the terminal cover 40 and the cell cover 14 is a positive temperature coefficient (PTC) device 42 that substantially limits the flow of current under abusive electrical conditions. In another embodiment, the cell 10 may also include a pressure relief vent. The cell cover 14 has an aperture comprising an inward projecting central vent well 28 with a vent hole 30 in the bottom of the well 28. The aperture is sealed by a vent ball 32 and a thin-walled thermoplastic bushing 34, which is compressed between the vertical wall of the vent well 28 and the periphery of the vent ball 32. When the cell internal pressure exceeds a predetermined level, the vent ball 32, or both the ball 32 and bushing 34, is forced out of the aperture to release pressurized gases from the cell 10. In other embodiments, the pressure relief vent can be an aperture closed by a rupture membrane, such as disclosed in U.S. Patent Application Publication No. 2005/0244706, herein fully incorporated by reference, or a relatively thin area such as a coined groove, that can tear or otherwise break, to form a vent aperture in a portion of the cell, such as a sealing plate or container wall.

In one embodiment, the terminal portion of the electrode lead 36, disposed between the side of the electrode assembly and the side wall of the can, may have a shape prior to insertion of the electrode assembly into the can, preferably non-planar that enhances electrical contact with the side wall of the can and provides a spring-like force to bias the lead against the can side wall. During cell manufacture, the shaped terminal portion of the lead can be deformed, e.g., toward the side of the electrode assembly, to facilitate its insertion into the can, following which the terminal portion of the lead can spring partially back toward its initially non-planar shape, but remain at least partially compressed to apply a force to the inside surface of the side wall of the can, thereby making good physical and electrical contact with the can.

The cell container is often a metal can with a closed bottom such as the can in FIG. 2. The can material and thickness of the container wall will depend in part of the active materials and electrolyte used in the cell. A common material type is steel. For example, the can may be made of cold rolled steel (CRS), and may be plated with nickel on at least the outside to protect the outside of the can from corrosion. Typically, CRS containers according to the invention can have a wall thickness of approximately between 7 and 10 mils for a FR6 cell, or 6 to 9 mils for a FR03 cell. The type of plating can be varied to provide varying degrees of corrosion resistance, to improve the contact resistance or to provide the desired appearance. The type of steel will depend in part on the manner in which the container is formed. For drawn cans, the steel can be a diffusion annealed, low carbon, aluminum killed, SAE 1006 or equivalent steel, with a grain size of ASTM 9 to 11 and equiaxed to slightly elongated grain shape. Other steels, such as stainless steels, can be used to meet special needs. For example, when the can is in electrical contact with the cathode, a stainless steel may be used for improved resistance to corrosion by the cathode and electrolyte.

The cell cover can be metal. Nickel plated steel may be used, but a stainless steel is often desirable, especially when the cover is in electrical contact with the cathode. The complexity of the cover shape will also be a factor in material selection. The cell cover may have a simple shape, such as a thick, flat disk, or it may have a more complex shape, such as the cover shown in FIG. 2. When the cover has a complex shape like that in FIG. 2, a type 304 soft annealed stainless steel with ASTM 8-9 grain size may be used to provide the desired corrosion resistance and ease of metal forming. Formed covers may also be plated, with nickel for example.

The terminal cover should have good resistance to corrosion by water in the ambient environment, good electrical conductivity and, when visible on consumer batteries, an attractive appearance. Terminal covers are often made from nickel plated cold rolled steel or steel that is nickel plated after the covers are formed. Where terminals are located over pressure relief vents, the terminal covers generally have one or more holes to facilitate cell venting.

The gasket may be made from any suitable thermoplastic material that provides the desired sealing properties. Material selection is based in part on the electrolyte composition. Examples of suitable materials include polypropylene, polyphenylene sulfide, tetrafluoride-perfluoroalkyl vinylether copolymer, polybutylene terephthalate and combinations thereof. Preferred gasket materials include polypropylene (e.g., PRO-FAX® 6524 from Basell Polyolefins in Wilmington, Del., USA) and polyphenylene sulfide (e.g., XTEL™ XE3035 or XE5030 from Chevron Phillips in The Woodlands, Tex., USA). Small amounts of other polymers, reinforcing inorganic fillers and/or organic compounds may also be added to the base resin of the gasket.

The gasket may be coated with a sealant to provide the best seal. Ethylene propylene diene terpolymer (EPDM) is a suitable sealant material, but other suitable materials can be used.

The vent bushing may be made from a thermoplastic material that is resistant to cold flow at high temperatures (e.g., 75° C.). The thermoplastic material may comprise a base resin such as ethylene-tetrafluoroethylene, polybutylene terephthalate, polyphenylene sulfide, polyphthalamide, ethylene-chlorotrifluoroethylene, chlorotrifluoroethylene, perfluoroalkoxyalkane, fluorinated perfluoroethylene polypropylene and polyetherether ketone. Ethylene-tetrafluoroethylene copolymer (ETFE), polyphenylene sulfide (PPS), polybutylene terephthalate (PBT) and polyphthalamide are preferred. The resin can be modified by adding a thermal-stabilizing filler to provide a vent bushing with the desired sealing and venting characteristics at high temperatures. The bushing can be injection molded from the thermoplastic material. TEFZEL® HT2004 (ETFE resin with chopped glass filler), polythlalamide (e.g., AMODEL® ET 10011 NT, from Solvay Advanced Polymers, Houston, Tex.) and polyphenylene sulfide (e.g., e.g., XTEL™ XE3035 or XE5030 from Chevron Phillips in The Woodlands, Tex., USA) are preferred thermoplastic bushing materials.

The vent ball can be made from any suitable material that is stable in contact with the cell contents and provides the desired cell sealing and venting characteristic. Glasses or metals, such as stainless steel, can be used. In the event a foil vent is utilized in place of the vent ball assembly described above (e.g., pursuant to U.S. Patent Application Publication No. 2005/0244706), the above referenced materials may still be appropriately substituted.

The anode comprises a strip of lithium metal, sometimes referred to as lithium foil. The composition of the lithium can vary, though for battery grade lithium the purity is always high. The lithium can be alloyed with other metals, such as aluminum, to provide the desired cell electrical performance or handling ease, although the amount of lithium in any alloy should nevertheless be maximized and alloys designed for high temperature application (i.e., above the melting point of pure lithium) are not contemplated. Appropriate battery grade lithium-aluminum foil, containing 0.5 weight percent aluminum, is available from Chemetall Foote Corp., Kings Mountain, N.C., USA. An anode consisting essentially of lithium or a lithium alloy (for example, 0.5 wt. % Al and 99+ wt. % Li) is preferred, with an emphasis placed on maximizing the amount of active material (i.e., lithium) in any such alloy.

As in the cell in FIG. 2, a separate current collector (i.e., an electrically conductive member, such as a metal foil, on which the anode is welded or coated, or an electrically conductive strip running along substantial portions the length of the anode such that the collector would be spirally wound within the jellyroll) is not needed for the anode, since lithium has a high electrical conductivity. By not utilizing such a current collector, more space is available within the container for other components, such as active materials. Anode current collectors may be made of copper and/or other appropriate high conductivity metals as long as they are stable when exposed to the other interior components of the cell (e.g., electrolyte), and therefore also add cost.

The electrical connection can be maintained between each of the electrodes and the opposing terminals proximate to or integrated with the housing. An electrical lead 36 can be made from a thin metal strip connecting the anode or negative electrode to one of the cell terminals (the can in the case of the FR6 cell shown in FIG. 2). When the anode includes such a lead, it is oriented substantially along a longitudinal axis of the jellyroll electrode assembly and extends partially along a width of the anode. This may be accomplished embedding an end of the lead within a portion of the anode or by simply pressing a portion such as an end of the lead onto the surface of the lithium foil. The lithium or lithium alloy has adhesive properties and generally at least a slight, sufficient pressure or contact between the lead and electrode will weld the components together. The negative electrode may be provided with a lead prior to winding into a jellyroll configuration. The lead may also be connected via appropriate welds.

The metal strip comprising the lead 36 is often made from nickel or nickel plated steel with sufficiently low resistance (e.g., generally less than 15 mΩ/cm and preferably less than 4.5 mΩ/cm) in order to allow sufficient transfer of electrical current through the lead and have minimal or no impact on service life of the cell. Examples of suitable negative electrode lead materials include, but are not limited to, copper, copper alloys, for example copper alloy 7025 (a copper, nickel alloy comprising about 3% nickel, about 0.65% silicon, and about 0.15% magnesium, with the balance being copper and minor impurities); and copper alloy 110; and stainless steel. Lead materials should be chosen so that the composition is stable within the electrochemical cell including the nonaqueous electrolyte. Generally, lead materials should not include or should include only relatively minor amounts (impurities) of aluminum, iron and zinc.

The cathode is in the form of a strip that comprises a current collector and a mixture that includes one or more electrochemically active materials, usually in particulate form. Iron disulfide ($FeS_2$) is a preferred active material. In a $Li/FeS_2$ cell, the active material comprises greater than 50 weight percent $FeS_2$. The cathode can also contain one or more additional active materials, depending on the desired cell electrical and discharge characteristics. The additional active cathode material may be any suitable active cathode material. Examples include metal oxides, $Bi_2O_3$, $C_2F$, $CF_x$, $(CF)_n$, $CoS_2$, CuO, CuS, FeS, $FeCuS_2$, $MnO_2$, $Pb_2Bi_2O_5$ and S. More preferably the active material for a $Li/FeS_2$ cell cathode comprises at least about 95 weight percent $FeS_2$, yet more preferably at least about 99 weight percent $FeS_2$, and most preferably $FeS_2$ is the sole active cathode material. $FeS_2$ having a purity level of at least 95 weight percent is available from Washington Mills, North Grafton, Mass., USA; Chemetall GmbH, Vienna, Austria; and Kyanite Mining Corp., Dillwyn, Va., USA. Note that the discussion of "purity" of $FeS_2$ acknowledges that pyrite is a specific and preferred mineral form of $FeS_2$. However, pyrite often times has small levels of impurities (typically silicon oxides) and, because only the $FeS_2$ is electrochemically active in pyrite, references to percent purity of $FeS_2$ are made with respect to the amount of pyrite, usually on a weight percentage basis. A more comprehensive description of the cathode, its formulation and a manner of manufacturing the cathode is provided below.

The current collector may be disposed within or imbedded into the cathode surface, or the cathode mixture may be coated onto one or both sides of a thin metal strip. Aluminum is a commonly used material. The current collector may extend beyond the portion of the cathode containing the cathode mixture. This extending portion of the current collector can provide a convenient area for making contact with the electrical lead connected to the positive terminal. It is desirable to keep the volume of the extending portion of the current collector to a minimum to make as much of the internal volume of the cell available for active materials and electrolyte.

The cathode is electrically connected to the positive terminal of the cell. This may be accomplished with an electrical lead, often in the form of a thin metal strip or a spring, as shown in FIG. 2, although welded connections are also possible. The lead is often made from nickel plated stainless steel. Still another embodiment may utilize a connection similar to that disclosed in United States Patent Publication No. 20070275298 and/or U.S. patent application Ser. No. 11/787,436, which should publish on or after Oct. 16, 2008, both of which are commonly assigned to the assignee of this application and incorporated by reference herein. Notably, to the extent a cell design may utilize one of these alternative electrical connectors/current limiting devices, the use of a PTC may be avoided. In the event an optional current limiting device, such as a standard PTC, is utilized as a safety mechanism to prevent runaway discharge/heating of the cell, a suitable PTC is sold by Tyco Electronics in Menlo Park, Calif., USA. A typical, standard PTC device generally comprises a resistance of approximately 36 mΩ/cm. Other alternatives, including lower resistance devices of approximately 18 mΩ/cm, are also available.

The separator is a thin microporous membrane that is ion-permeable and electrically nonconductive. It is capable of holding at least some electrolyte within the pores of the separator. The separator is disposed between adjacent surfaces of the anode and cathode to electrically insulate the electrodes from each other. Portions of the separator may also insulate other components in electrical contact with the cell terminals to prevent internal short circuits. Edges of the separator often extend beyond the edges of at least one electrode to insure that the anode and cathode do not make electrical contact even if they are not perfectly aligned with each other. However, it is desirable to minimize the amount of separator extending beyond the electrodes.

To provide good high power discharge performance, it is desirable that the separator have the characteristics (pores with a smallest dimension of at least about 0.005 μm and a largest dimension of no more than about 5 μm across, a porosity in the range of about 30 to 70 percent, an area specific resistance of from 2 to 15 ohm-cm$^2$ and a tortuosity less than 2.5) disclosed in U.S. Pat. No. 5,290,414, issued Mar. 1, 1994, and hereby incorporated by reference.

Suitable separator materials should also be strong enough to withstand cell manufacturing processes as well as pressure that may be exerted on the separator during cell discharge without tears, splits, holes or other gaps developing that could result in an internal short circuit. To minimize the total separator volume in the cell, the separator should be as thin as possible, preferably less than about 25 μm thick, and more preferably no more than about 22 μm thick, such as 20 μm or 16 μm. A high tensile stress is desirable, preferably at least about at least about 500 kgf/cm$^2$ in the transverse direction and 700 kgf/cm$^2$ in the machine direction. Preferably the average dielectric breakdown voltage will be at least about 1500 volts. The preferred maximum effective pore size is from about 0.08 μm to 0.40 μm. Preferably the BET specific surface area will be between no greater than 40 m$^2$/g and at least about 15 m$^2$/g, with an area specific resistance preferably less than 5.0 ohm-cm$^2$. These properties are described in greater detail in U.S. Patent Publication No. 2005/0112462, which is hereby incorporated by reference.

Ultimately, the thickness of the separator must be optimized to allow for adequate physical separation of the electrodes, particularly under abuse conditions, while still providing optimal ionic conduction. Cost considerations, coupled with the fact that thinner separators may enable more surface area between the active materials in the jellyroll, dictate that the thinnest separator possible may not always be the preferred choice, especially to the extent that the thickness of the electrodes also impacts the surface area in the jellyroll and, therefore, the amount of separator ultimately required. Consequently, a microporous membrane having a thickness between 16 and 25 microns, in combination the cathode formulation and constraints on container strength disclosed herein, forms a preferred aspect of this invention. Even more preferable, a microporous membrane having polypropylene and/or polyethylene and thickness between about 16 and about 22 microns is contemplated.

Similarly, the thickness of the electrodes impacts the amount of surface area in the jellyroll. Here again, that thickness and surface area will further dictate how the reaction proceeds during discharge and, ultimately, how much void space is needed and how much radial force is exerted on the container during discharge. Therefore, an anode with a thickness between about 150 and about 200 microns and a cathode with a thickness (inclusive of the thickness of the current collector and measured after the cathode coating been dried and calendared) between about 180 and about 220 are preferred. These thicknesses represent the entire electrode as it is incorporated into the jellyroll assembly (i.e., coating on both sides of the cathode current collector and an anode that is discharged from both surfaces). Correspondingly, the preferred amount of interfacial surface area between the electrodes (i.e., the amount of anode and cathode adjacent to one another across the separator and, therefore, expected to discharge/deliver capacity) in a standard FR6 cell is about 185 to 230 cm$^2$.

Separator membranes for use in lithium batteries are often made of polypropylene, polyethylene or ultrahigh molecular weight polyethylene, with polyethylene being preferred. The separator can be a single layer of biaxially oriented microporous membrane, or two or more layers can be laminated together to provide the desired tensile strengths in orthogonal directions. A single layer is preferred to minimize the cost. Suitable single layer biaxially oriented polyethylene microporous separator is available from Tonen Chemical Corp., available from EXXON Mobile Chemical Co., Macedonia, N.Y., USA. Setela F20DHI grade separator has a 20 μm nominal thickness, and Setela 16MMS grade has a 16 μm nominal thickness. Suitable separators with similar properties are also available from Entek Membranes in Lebanon, Oreg., USA.

A nonaqueous electrolyte, containing water only in very small quantities as a contaminant (e.g., no more than about 500 parts per million by weight, depending on the electrolyte salt being used), is used in the battery cell of the invention. Any nonaqueous electrolyte suitable for use with lithium and active cathode material may be used. The electrolyte contains one or more electrolyte salts dissolved in an organic solvent. For a Li/FeS$_2$ cell, examples of suitable salts include lithium bromide, lithium perchlorate, lithium hexafluorophosphate, potassium hexafluorophosphate, lithium hexafluoroarsenate, lithium trifluoromethanesulfonate and lithium iodide; and suitable organic solvents include one or more of the following: dimethyl carbonate, diethyl carbonate, methylethyl carbonate, ethylene carbonate, propylene carbonate, 1,2-butylene carbonate, 2,3-butylene carbonate, methyl formate, γ-butyrolactone, sulfolane, acetonitrile, 3,5-dimethylisoxazole, n,n-dimethyl formamide and ethers. The salt/solvent combination will provide sufficient electrolytic and electrical conductivity to meet the cell discharge requirements over the desired temperature range. Ethers are often desirable because of their generally low viscosity, good wetting capability, good low temperature discharge performance and good high rate discharge performance. This is particularly true in Li/FeS$_2$ cells because the ethers are more stable than with MnO$_2$ cathodes, so higher ether levels can be used. Suitable ethers include, but are not limited to, acyclic ethers such as 1,2-dimethoxyethane, 1,2-diethoxyethane, di(methoxyethyl) ether, triglyme, tetraglyme and diethyl ether; and cyclic ethers such as 1,3-dioxolane, tetrahydrofuran, 2-methyl tetrahydrofuran and 3-methyl-2-oxazolidinone. Examples of suitable electrolytes are disclosed in U.S. Pat. Nos. 5,290,414 and 5,514,491, which are hereby incorporated by reference. 1,3-dioxolane and 1,2-dimethoxyethane are the preferred solvents, while lithium iodide and/or at least one of the following are the preferred salts: lithium triflate, lithium imide and lithium perchlorate.

The anode, cathode and separator strips are combined together in an electrode assembly. The electrode assembly may be a spirally wound design, such as that shown in FIG. 2, made by winding alternating strips of cathode, separator, anode and separator around a mandrel, which is extracted from the electrode assembly when winding is complete. At least one layer of separator and/or at least one layer of electrically insulating film (e.g., polypropylene) is generally wrapped around the outside of the electrode assembly. This serves a number of purposes: it helps hold the assembly together and may be used to adjust the width or diameter of the assembly to the desired dimension. The outermost end of the separator or other outer film layer may be held down with a piece of adhesive tape or by heat sealing. The anode can be the outermost electrode, as shown in FIG. 2, or the cathode can be the outermost electrode. Either electrode can be in electrical contact with the cell container, but internal short circuits between the outmost electrode and the side wall of the container can be avoided when the outermost electrode is the same electrode that is intended to be in electrical contact with the can.

The cell can be closed and sealed using any suitable process. Such processes may include, but are not limited to, crimping, redrawing, colleting and combinations thereof. For example, for the cell in FIG. 2, a bead is formed in the can after the electrodes and insulator cone are inserted, and the gasket and cover assembly (including the cell cover, contact spring and vent bushing) are placed in the open end of the can. The cell is supported at the bead while the gasket and cover assembly are pushed downward against the bead. The diameter of the top of the can above the bead is reduced with a segmented collet to hold the gasket and cover assembly in place in the cell. After electrolyte is dispensed into the cell through the apertures in the vent bushing and cover, a vent ball is inserted into the bushing to seal the aperture in the cell cover. A PTC device and a terminal cover are placed onto the cell over the cell cover, and the top edge of the can is bent inward with a crimping die to hold and retain the gasket, cover assembly, PTC device and terminal cover and complete the sealing of the open end of the can by the gasket.

While many consumer devices incorporate relatively high drain rates at ambient temperatures (i.e., 200 mA and above, on a continuous or intermittent basis), the inventor observed on extremely low drain rates and at elevated temperatures—i.e., less than 10 mA continuous drain at or above 45° C.—the normal one step discharge curve for an FR6 battery (comprising a lithium anode, $FeS_2$ cathode, and non-aqeuous electrolyte), segments into two distinct voltage plateaus (as shown along the right hand axis in FIG. 1), as illustrated in FIG. 1 with curve A1 showing the 8 mA continuous drain at 45° C. and curve A2 showing 200 mA continuous drain at room temperature.

Notably, it is believed that this two step discharge corresponds to the following reactions, wherein the first step would normally proceed quickly at ambient conditions:

$2Li+FeS_2 \leftrightarrow Li_2FeS_2$ $2Li+Li_2FeS_2 \leftrightarrow 2Li_2S+Fe$

Given the limited internal volume in a standard sized container, it is possible to use the forces exerted on the container discharge (caused by the reaction products formed/expanding within the container) in order to determine the internal void volume of the cell. To the extent that this expansion occurs at a steady state at ambient temperature, it is possible to then use information from a fully discharged cell to determine the initial void volume provided in the original cell design. It should be noted that "initial" internal void volume is to be measured when the cell is substantially at zero percent discharge, but after completion of any routine conditioning or preliminary discharge.

Accordingly, a strain gauge was calibrated to quantify the radial forces exerted by the lithium-iron disulfide jellyroll electrode assembly using an empty 10 mil nickel plated cold rolled steel (CRS) container. Controlled pneumatic pressure created differing amounts of radial forces within the cell, and the performance/output of the gauge was recorded. In turn, these performance metrics were then used in conjunction with a strain gauge to determine radial forces (in pounds per square inch, as plotted on the left side of the FIG. 1) exerted in actual FR6 cells by the jellyroll against this container throughout the discharge cycle, with the results for the 8 mA/45° C. performance indicated by curve B1 and curve B2 corresponding to the 200 mA/ambient in FIG. 1. From this information, a determination of optimal amount of void space for the improved lithium-iron disulfide cell can be made. That is, using the strain gauge method as a proxy, measurements can be taken during discharge of any battery to correlate the strain on the container of a known construction (i.e., material and thickness) during discharge to the amount of void provided in the initial design of the jellyroll electrode assembly. It is believed the radial forces exerted on the container are representative of the cathode coating formulation that is used, in combination with the other key cell design considerations discussed herein.

In order to insure safe operation and eliminate the possibility of disassembly of the cell during discharge, it is preferred to design the cell to limit the radial force to about 70 to 80 percent of the overall burst or yield strength of the container, whether it is cold rolled steel (CRS), titanium, aluminum, stainless steel or some other metal/alloy. Relying on these parameters, a comprehensive cell design is created, focusing primarily on two interrelated features: an improved cathode coating formulation and the selection of appropriate inert components which conform with the void requirements dictated by the amount of iron disulfide expected to react (and therefore expand) during discharge of the battery. The appropriate inert/inactive materials must be applied to an overall battery design that provides consistent reliability and safety for the battery for long periods of time and under a variety environmental conditions typically encountered by consumer batteries.

With respect to the cathode, all known commercially available FR6 and FR03 batteries incorporate a cathode coated onto a metallic foil current collector, typically an aluminum foil with a thickness between about 16 and 20 μm. The cathode is coated as a mixture which contains a number of materials that must be carefully selected to balance the processability, conductivity and overall efficiency of the coating. This coating consists primarily of iron disulfide (and its impurities); a binder, such as a polymeric binder, that is generally used to hold the particulate materials together and adhere the mixture to the current collector; one or more conductive materials such as metal, graphite and carbon black powders added to provide improved electrical conductivity to the mixture, although the amount of conductor depends upon the electrical conductivity of the active material and binder, the thickness of the mixture on the current collector and the current collector design; and various processing or rheological aids, such as fumed silica (AEROSIL® 200) or an over-based calcium sulfonate complex (EFKA® 6950), that are dependent upon the coating method, the solvent used and/or the mixing method itself.

Previous design approaches have focused on improved adhesion, based on polymer changes, which allows for greater compaction forces to be applied but does not improve the basic active energy volumetric percentage. In contrast, the current cathode mix formulation shown in Tables 2a and 2b below is based on minimizing non-electrochemically active materials and using additives that serve multiple functions. That is, the conductor provides both short and long range conductivity (as an example, graphitized acetylene or carbon blacks), and the processing aids provide both slurry/dispersion stability and rheology properties (such as shear sensitivity for high quality coatings and pyrite stability by neutralizing acidic byproducts created over time). This approach allows for a minimal amount of polymeric binder to hold the components together and minimizes electrical insulating effects otherwise caused by binders (which, in turn, would require more conductor).

The following are representative materials utilized in the new cathode formulation. The active material comprises pyrite which is at least approximately 95 wt. % pure ("battery grade"). The conductor may comprise PureBlack™ (carbon black) 205-110 from Superior Graphite Chicago, Ill. and/or MX15 from Timcal Westlake, Ohio. The binder/processing aids may comprise a polymeric binder comprising a styrene-ethylene/butylenes-styrene (SEBS) block copolymer, such as g1651 from Kraton Polymers Houston, Tex., and EFKA® 6950 overbased calcium sulfonate complex from Ciba, Heerenveen, Netherlands or AEROSIL® 200 fumed silica from Evonik Industries AG, Essen, Germany. Small amounts of impurities may be naturally present in any of the aforementioned materials, although care should be taken to utilize the highest purity pyrite source available so as to maximize the amount of $FeS_2$ present within the cathode.

Regarding the cathode formulation, it is preferable to have at least about 94 wt. % active material comprising battery grade pyrite or purer. It is more preferable to have at least about 95 wt. % active material comprising pyrite. It is more preferable to have at least about 96 wt. % active material comprising pyrite. It is even more preferable to have at least about 96.5 wt. % active material comprising pyrite. To the extent that $FeS_2$ is the most dense component in the cathode dry mix, the higher the cathode dry mix density will be indicative of more $FeS_2$ in the cathode coating.

The amount of active material in the cathode coating can either be determined by analyzing the mixture pre-fabrication or by determining the iron content post-formulation and correlating the detected level of iron to the weight percentage of pyrite in the cathode. The method of testing for iron content post-formulation can be conducted by dissolving a known amount (in terms of mass and volume/area) of cathode in acid, then testing for the total amount of iron in that dissolved sample using common quantitative analytical techniques, such as inductively coupled plasma atomic emission spectroscopy or atomic absorption spectroscopy. Testing of known coated cathode formulations according to this method have verified that the total amount of iron is representative of $FeS_2$ in the cell (particularly to the extent that is desirable to maximize the purity of $FeS_2$ in the cathode coating). It may also be possible to determine cathode density using a pycnometer, although certain binders may experience volumetric changes when exposed to the internal environment of a lithium-iron disulfide cell such that the density established by such methods may need to be adjusted further in order to arrive at the cathode dry mix density.

Notably, testing for the quantity of aluminum in the sample will allow for calculation of the thickness of the current collector (when the collector is aluminum) in a similar manner (e.g., ICP-AES or AA spectroscopy). Other similar analytical techniques may be employed to test for binders, processing aids and the like, depending upon the atomic and/or molecular composition of those components, and analysis of the anode and/or separator is possible using similar analytical and quantitative/qualitative techniques.

Additionally, it is preferable to have less than about 6 wt. % conductor, binder, and processing aids combined. It is more preferable to have less than about 5 wt. %. It is more preferable to have less than about 4 wt. % conductor, binder, and processing aids combined. It is even more preferable to have less than about 3.5 wt. %.

Regarding the conductor, it is preferable to have less than about 3 wt. % conductor in the cathode mixture. It is more preferable to have less than about 2 wt. % conductor. Regarding the binder, it is preferable to have less than about 3 wt. % binder in the cathode mixture. It is more preferable to have less than about 2 wt. % binder. It is even more preferable to have less than about 1.5 wt. % binder in the mix.

Regarding the processing aids, it is preferable to have less than about 1 wt. % processing aid in the cathode mixture. It is more preferable to have about 0.5 wt. % or less in the mix.

In terms of a complete cathode mixture composition, it is desirable to have a cathode mixture with greater than about 94 wt. % and less than about 99 wt. % active material comprising pyrite, about 0.1-3.0 wt. % conductor, about 0.1-3.0 wt. % binder, and about 0-1.0 wt. % processing aids. It is more desirable to have a cathode mixture with about 95-98 wt. % pyrite, about 0.5-2.0 wt. % conductor, about 0.5-2.0 wt. % binder, and about 0.1-0.5 wt. % processing aids. It is even more desirable to have a cathode mixture with about 96-97 wt. % pyrite, about 1.0-2.0 wt. % conductor, about 1.0-1.5 wt. % binder, and about 0.3-0.5 wt. % processing aids.

It is also desirable to use cathode materials with small particle sizes to minimize the risk of puncturing the separator. For example, $FeS_2$ can be sieved, at least through a 230 mesh (62 μm) screen or smaller. More preferably, the $FeS_2$ may be milled or processed as described in U.S. Patent Publication No. 2005/0233214, which is incorporated by reference herein. In one embodiment, it is preferable for the $FeS_2$ to be media milled to have an average d50 particle size than 10 μm or less. Other cathode mix components should be carefully selected with an eye toward chemical compatibility/reactivity and to avoid similar particle-size-based mechanical failure issues.

It is also desirable to create a cathode mixture composition having greater volume percentage of active material, and a reduced volume percentage of non-active material. Prior art examples have shown pyrite to comprise approximately 78.8-81.3 vol. % of the cathode mixture. Additionally, the conductor, polymeric binder, and processing aids comprised about 9.2-11.5 vol. %, 7.3-9.3 vol. %, and 0-1.1 vol. %, respectively. Using the variety of preferred materials discussed above, it is desirable to achieve a cathode mixture with greater than about 85 vol. % pyrite. It is more preferable to achieve greater than about 87 vol. % pyrite. It is even more preferable to achieve greater than about 89 vol. % pyrite in the cathode mixture. Additionally, it is preferable to achieve less than about 6 vol. % conductor. It is more preferable to achieve less than about 5 vol. % conductor. It is even more preferable to achieve less than about 4 vol. % conductor in the cathode mixture formulation.

Notably, there are generic teachings in the art, such as Chinese Patent Application No.: 200410026754.0, which recite an extremely broad ranges of possible cathode formulations. In that cited example, it contemplates a coating with 60-99 wt. % iron disulfide, 0.5-20 wt. % "adhesive" and 0.5-20 wt. % conductive additives. However, no further guidance is provided on the design considerations of the battery, particularly with respect to the cell container, jellyroll component dimensions or other inactives. To illustrate, the examples of the preferred formulation in that particular publication simply disclose coatings with 87.7 wt. % $FeS_2$, 5.3 wt. % conductive additives and 7.0 wt. % adhesives, and the resulting cells (presumably for AA sized) only deliver a capacity of approximately 3000 mAh at 1000 mA discharge to a 0.8 V cutoff and 3100 mAh at 200 mA discharge to 0.8 V cutoff.

It is also desirable to create a cathode mixture composition having a minimum cathode dry mix density. Prior art typically have dry mix densities between approximately 4.12 and 4.31 g/cc. Using the variety of preferred materials discussed above at their preferred composition levels, it is possible to achieve an increased cathode dry mix density of greater than about 4.35 g/cc. It is more preferable to achieve a dry mix density of greater than about 4.40 g/cc. It is even more preferable to achieve a dry mix density of greater than about 4.45 g/cc.

The cathode mixture is applied to the foil collector using any number of suitable processes, such as three roll reverse, comma coating or slot die coating. The methods of coating described in U.S. patent application Ser. No. 11/493,314, which should publish on or after Jan. 31, 2008, and is incorporated by reference, could be used. One preferred method of making $FeS_2$ cathodes is to roll coat a slurry of active material mixture materials in a highly volatile organic solvent (e.g., trichloroethylene) onto both sides of a sheet of aluminum foil, dry the coating to remove the solvent, calender the coated foil to compact the coating, slit the coated foil to the desired width and cut strips of the slit cathode material to the desired length. The use of volatile solvents maximize the efficiency of recovering such solvents, although it is possible to utilize other solvents, including aqueous-based compositions, in order to roll coat the cathode mix described above.

After or concurrent with drying to remove any unwanted solvents, the resulting cathode strip is densified via calendering or the like to further compact the entire positive electrode. In light of the fact that this strip will then be spirally wound with separator and a similarly (but not necessarily identically) sized anode strip to form a jellyroll electrode assembly, this densification maximizes loading of electrochemical material in the jellyroll electrode assembly. Prior art examples have shown cathode loadings to be between about 21-22 $mg/cm^2$. In one embodiment, the cathode loading may be increased to more than about 24 $mg/cm^2$.

However, the cathode cannot be over-densified as some internal cathode voids are needed to allow for expansion of the iron disulfide during discharge and wetting of the iron disulfide by the organic electrolyte. More practically, there are also operational limits as to the amount of force that can be applied to compact the coatings to high densities, and the stress on the current collector created by such forces can result in unwanted stretching and/or actual de-lamination of the coating. Therefore, it is preferable that there be sufficient cathode void volume in the cathode formulation. Preferably, the void volume in the cathode is between about 20 and 50%. More preferably, it is between about 25 and 45%. Even more preferably, the void volume is between about 28 and 40%.

Regarding the selection of appropriate inert materials (all identified and described above), the areas of specific focus were selection of a separator with sufficient tensile strength, a container and separator with adequate thickness to withstand radial forces exerted by the jellyroll (which incorporates the improved cathode coating of Tables 2a and 2b) and the deliberate provision of a specified initial amount of internal void volume within the cell prior to discharge are the key components.

Improvements to the electrochemical cell can be measured based on the electrochemical cell performance under a variety of different tests. In one aspect, the electrochemical cell may be tested in a digital still camera (DSC) following the testing procedure described above. In this DSC test, the camera takes two pictures/images every minute until the battery life is exhausted. A typical prior art $Li/FeS_2$ cell has shown the ability to last approximately 320 minutes (or 640 images). This is generally four to eight times longer than a typical alkaline battery. In one aspect, the improved cathode formulation preferably may take at least about 350 minutes (700 images). It is more preferable to take at least about 360 minutes (720 images). It is even more preferable to take at least about 370 minutes (740 images).

In another aspect, the electrochemical cell may be tested under constant current drain conditions, to a 1.0 V cutoff. It is preferable to perform the test under a constant current drain of 200 mA at ambient temperature. The cell performance may be defined in terms of energy (mWh) or energy per cell weight (Wh/kg or mWh/g). A typical prior art $Li/FeS_2$ cell has shown the ability to produce between about 4200 and 4400 mWh, or close to about 300 Wh/kg under a 200 mA constant drain. In one aspect, the improved electrochemical cell may produce at least about 4550 mWh under a constant drain of 200 mA. It is more preferable to produce at least about 4650 mWh. It is even more preferable to produce at least about 4750 mWh. Alternatively, the electrochemical cell may produce at least about 310 Wh/kg. It is more preferable to produce at least about 315 Wh/kg. It is even more preferable to produce at least about 320 Wh/kg. It is even more preferable to produce at least about 325 Wh/kg. For FR03 batteries according to the present invention, at 100 mA continuous drain to a 1.0 V cutoff, capacity of more than 1950 mAh and energy density of 265 Wh/kg can be achieved.

In another aspect, the electrochemical cell may be tested under constant power drain conditions, to a 1.0 V cutoff. It is preferable to perform the test under a constant power drain of 1000 mW at ambient temperature. The cell performance may be defined in terms of energy (mWh or Wh) or energy per cell weight (Wh/kg). A typical prior art $Li/FeS_2$ cell has shown the ability to produce between about 3600 and 3800 mWh, or approximately 250 Wh/kg under a constant power drain of 1000 mW. In one embodiment, the improved electrochemical cell may produce at least about 4100 mWh under a constant power drain of 1000 mW. It is more preferable to produce at least about 4200 mWh. It is even more preferable to produce at least about 4300 mWh. Alternatively, the electrochemical cell may produce at least about 270 Wh/kg. It is more preferable to produce at least about 280 Wh/kg. It is even more preferable to produce at least about 290 Wh/kg. It is even more preferable to produce at least about 300 Wh/kg.

The above description is particularly relevant to cylindrical $Li/FeS_2$ cells, such as FR6 and FR03 types, as defined in International Standards IEC 60086-1 and IEC 60086-2, published by the International Electrotechnical Commission, Geneva, Switzerland. However, the invention may also be adapted to other cylindrical cell sizes where the sidewall height exceeds the diameter of the container, cells with other cathode coating schemes and/or seal and/or pressure relief vent designs.

For the sake of comparison, known commercial $LiFeS_2$ batteries publicly available at the time of this invention deliver approximately 1800 mAh at 100 mA continuous to a 1.0 V cutoff in the FR03 size, with a corresponding energy density of about 244 Wh/kg. Commercially available FR6 batteries provide approximately 3100 mAh at 200 mA continuous to a 1.0 V cutoff. Further information regarding the performance of previously known FR6 batteries can also be found in the examples below. In both cases (and as better illustrated in FIG. 1 with respect to a FR6 battery), these commercial batteries do not exert less than 50%, and more specifically about 45%, of the yield strength of the container.

Features of the invention and its advantages will be further appreciated by those practicing the invention. Furthermore, certain embodiments of the components and the performance of the cell assembled as described will be realized.

In the same manner, it will be understood by those who practice the invention and those skilled in the art that various modifications and improvements may be made to the invention without departing from the spirit of the disclosed concepts. The scope of protection afforded is to be determined by the claims and by the breadth of interpretation allowed by law.

The invention will now be described with reference to the following non-limiting examples. Unless otherwise noted in the examples, the separator thickness for each cell was 20 microns.

EXAMPLE 1

In this example, an electrochemical cell comprising lithium as the active anode material and pyrite as the active cathode material is constructed as follows. A continuous strip of lithium metal foil alloyed with aluminum is provided along with an aluminum cathode current collector continuous strip. A cathode coating slurry is prepared using the following solids:

| Material | Weight % (dry) | density (g/cm³) |
|---|---|---|
| pyrite | 96.7 | 4.82 |
| PureBlack ™ 205-110 conductor | 1.8 | 2.0 |
| Kraton ® G1651 polymeric binder | 1.2 | 0.91 |
| Aerosil ® processing aid | 0.3 | 2.20 |
| | | 4.461 g/cc |

PureBlack™ (carbon black) 205-110 is available from Superior Graphite, Chicago, Ill. Alternatively, the conductor may be MX15 from Timcal Westlake, Ohio. The binder/processing aids may comprise a styrene-ethylene/butylenes-styrene (SEBS) block copolymer, such as Kraton® G1651 from Kraton Polymers, Houston, Tex. and Aerosil® fumed silica from Evonik Industries AG, Essen, Germany.

Battery grade iron pyrite with a purity level of 95 wt. % available from Chemetall is sieved through a 230 mesh screen to remove particles with a dimension greater than 62 microns. The pyrite is then media milled to obtain an average d50 particle size of about 3 microns. The sieved and milled pyrite is weighed along with the conductive carbon additive, wetted with a 1,1,2-trichloroethylene solvent and mixed via a high speed disc mixer. Once thoroughly wetted and blended, the polymer binder is added to the mixer and blended until dissolved uniformly in the mixture. The processing aid is then blended into the mixture and additional solvent is incorporated to reach a desired viscosity suitable for the coating.

The slurry is then applied to a cathode aluminum strip substrate in a roll coating operation. After drying, the cathode strip undergoes a densification process in a calendaring operation. The resulting cathode coating has a solids packing factor of approximately 60%.

The anode, cathode, and a suitable separator are wound together from continuous webs into an electrode assembly with an overwrap or tape on the exterior of the jellyroll and disposed within a can or other suitable container.

EXAMPLE 2

A battery is fabricated in a similar fashion to Example 1, except the cathode coating slurry is prepared using the following solids:

| Material | Weight % (dry) | density (g/cm³) |
|---|---|---|
| pyrite | 96.5 | 4.82 |
| PureBlack ™ 205-110 conductor | 1.8 | 2.0 |
| Kraton ® G1651 polymeric binder | 1.2 | 0.91 |
| Efka ® processing aid | 0.5 | 1.15 |
| | | 4.410 g/cc |

Efka® 6950 is available from Ciba, Heerenveen, Netherlands. Other suppliers of over base calcium sulfonates may also be utilized.

A range of representative prior art cathode mixes as compared to Examples 1 and 2 is shown in Tables 2a and 2b below, along with information from column 5 of U.S. Pat. No. 6,849,360 providing a specific example of such previously known mixes.

COMPARATIVE EXAMPLE

A battery is fabricated in a similar fashion to Example 1, except the cathode coating slurry is prepared according using the formulation in the Example of U.S. Pat. No. 6,849,360 ("the '360 example").

TABLE 2a

Comparison of Cathode Mixes.

| Trait | U.S. Pat. No. 6,849,360 | Example 1 | Example 2 |
|---|---|---|---|
| Vol. % pyrite (FeS₂ + impurities) | 79.3 | 89.1 | 89.3 |
| Vol. % Conductor | 10.4 | 4.0 | 4.0 |
| Vol. % Polymeric Binder | 9.1 | 5.9 | 5.9 |
| Vol. % Processing Aid | 1.1 | 1.0 | 0.8 |
| Cathode Dry Mix Density* | 4.16* | 4.45 | 4.45 |

*as determined in 6,849,360 at Col. 5, lines 8-10

TABLE 2b

Comparison of Cathode Mixes.

| Trait | U.S. Pat. No. 6,849,360 | Example 1 | Example 2 |
|---|---|---|---|
| wt. % pyrite (FeS₂ + impurities) | 92.0 | 96.5 | 96.7 |
| wt. % Conductor | 5.4 | 1.8 | 1.8 |
| wt. % Polymeric Binder | 0.6 | 1.2 | 1.2 |
| wt. % Processing Aid | 2.0 | 0.5 | 0.3 |

As shown in Table 2a, the example formulation from the '360 example is compared with the formulations of Examples 1 and 2 in terms of volume percent. The volume of the active material (i.e. pyrite) has increased significantly in comparison to the '360 example. Examples 1 and 2 have greater than 89 vol. % active material in comparison to the '360 example which is approximately 79.3 vol. %. Additionally, the volume of the conductor and the volume of the polymeric binder have both decreased significantly in the new formulations, effectively reducing the amount of non-active cathode material in the formulation. Examples 1 and 2 show a conductor of around 4.0 vol. %, and a polymeric binder of around 5.9 vol. %. These are lower amounts than the '360 example in which the conductor and binder took up approximately 10.4 vol. % and 9.1 vol. %, respectively.

As shown in Table 2b, the '360 example is compared with the formulations of Examples 1 and 2 in terms of weight percent. The weight percent of the pyrite in Examples 1 and 2 is greater than what has been embodied in the '360 example. The formulations of Examples 1 and 2 show pyrite levels of 96.5 and 96.7 wt. %. Correlated with the increase in pyrite is a decrease in the weight percentage amount of combined conductor, binder, and processing aids.

In one embodiment, improvements to the electrochemical cell were measured based on the electrochemical cell performance in a digital still camera (DSC) testing procedure. In this particular DSC test, the camera takes two pictures/images every minute until the cell is exhausted. Multiple cells have been tested for each cell formulation shown below. The results are shown below in Table 3, with the average performance displayed from the cells tested.

TABLE 3

| Formulation | Wt % FeS$_2$ | Loading (mg/cm$^2$) | Density (% solids) | Anode Thickness | Electrolyte (molal) | PTC (mΩ/cm) | DSC (minutes) | DSC (images) |
|---|---|---|---|---|---|---|---|---|
| A | 92.0 | 21.77 | 66 | 150 μm | 0.75 m | 36 | 320 | 640 |
| B | 96.5 | 24.4 | 60 | 175 μm | 0.75 m | 36 | 353 | 706 |
| C | 96.5 | 24.4 | 60 | 175 μm | 0.75 m | 36 | 357 | 714 |
| D | 96.5 | 24.4 | 60 | 175 μm | 0.75 m | 18 | 364 | 728 |
| E | 96.7 | 24.4 | 60 | 175 μm | 0.75 m | 18 | 366 | 732 |
| F | 96.5 | 24.4 | 60 | 175 μm | 1 m | 36 | 366.5 | 733 |
| G | 96.5 | 24.4 | 60 | 175 μm | 1 m | 18 | 363 | 726 |
| H | 96.7 | 24.4 | 60 | 175 μm | 1 m | 18 | 377 | 754 |

In Table 3, the '360 example is represented by formulation A, wherein the cathode comprised 92.0 wt. % pyrite. This formulation showed the ability to last an average of 320 minutes (or 640 images) for a single FR6 cell. The remainder of the formulations represent different variations of electrolyte cells centered around the cathode formulations described in Examples 1 and 2 (i.e. 96.5 and 96.7 wt. % pyrite). Additionally, the cathode loading was 24.4 mg/cm$^2$ and cathode density was 60% solids for each formulation. Adjustments were also tested with different separator formulations (DHI/LP v. DHI/DHI), concentrations of the electrolyte (0.75 v. 1.0 molal), and PTC resistances (36 mΩ v. 18 mΩ).

The performance of the electrochemical cells at the higher pyrite loadings was noticeable over the formulation A. There was an increase in performance by at least 33 minutes (66 images), and upwards of 57 minutes (114 images) for a single FR6 cell. This represents an output improvement for the DSC test of approximately 10-18% over the prior art. The pyrite formulations with 96.7 wt. % performed slightly better than those with 96.5 wt. % pyrite. Additionally, a higher concentration of electrolyte, reduction of the PTC resistance, and DHI/DHI all helped performance slightly as well.

In another embodiment, the electrochemical cells were tested under constant current drain conditions, measuring the energy delivered to a 1.0 V cutoff (the presumptive industry standard for any test stated herein that does not specify a cutoff voltage). Cell performance was defined in terms of energy (mWh) or energy per cell weight (Wh/kg or mWh/g). The results from these tests are shown below in Table 4, wherein the constant current drain was 200 mA. Multiple cells have been tested for each cell formulation shown below in Table 4, with the average performance displayed from the cells tested.

In Table 4, the '360 example is represented by formulation A, wherein the cathode comprised 92.0 wt. % pyrite. This formulation showed the ability to produce approximately 4325 mWh for a single FR6 cell before the cutoff voltage (i.e., 1.0 V). With an average cell weight of 14.69 g, the average energy output for a 92.0 wt. % pyrite cell was 294 Wh/kg, under constant power drain conditions. As discussed with Table 3 above, the remainder of the formulations represent different variations of electrolyte cells centered around the cathode formulations described in Examples 1 and 2 (i.e. 96.5 and 96.7 wt. % pyrite).

The performance of the electrochemical cells at higher pyrite loadings was noticeable over the formulation A. There was an increase in performance before the voltage cut by at least 341 mWh, and upwards of 436 mWh for a single FR6 cell. In terms of Wh/kg, the performance improvement for the cells ranged between 24 and 32 Wh/kg. This represents an output performance improvement of approximately 8-11% for the constant current drain test.

In another embodiment, the electrochemical cells were tested under constant power drain conditions, again to a 1.0 V cutoff. Cell performance was defined in terms of energy (mWh) or energy per cell weight (Wh/kg). The results from these tests are shown below in Table 5, wherein the constant power drain was 1000 mW. Multiple cells have been tested for each cell formulation shown below in Table 5, with the average performance displayed from the cells tested.

TABLE 4

| Formulation | Cell wt. (g) | Wt % FeS$_2$ | Loading (mg/cm$^2$) | Density (% solids) | Anode Thickness | Electrolyte (molal) | PTC (mΩ/cm) | Constant Current (200 mA) mWh | Constant Current (200 mA) Wh/kg |
|---|---|---|---|---|---|---|---|---|---|
| A | 14.69 | 92.0 | 21.77 | 66 | 150 μm | 0.75 m | 36 | 4325 | 294 |
| B | 14.78 | 96.5 | 24.4 | 60 | 175 μm | 0.75 m | 36 | 4761 | 322 |
| C | 14.70 | 96.5 | 24.4 | 60 | 175 μm | 0.75 m | 36 | 4678 | 318 |
| D | 14.70 | 96.5 | 24.4 | 60 | 175 μm | 0.75 m | 18 | 4669 | 318 |
| E | 14.43 | 96.7 | 24.4 | 60 | 175 μm | 0.75 m | 18 | 4666 | 323 |
| F | 14.79 | 96.5 | 24.4 | 60 | 175 μm | 1 m | 36 | 4753 | 321 |
| G | 14.58 | 96.5 | 24.4 | 60 | 175 μm | 1 m | 18 | 4760 | 326 |
| H | 14.72 | 96.7 | 24.4 | 60 | 175 μm | 1 m | 18 | 4756 | 323 |

TABLE 5

| Formulation | Cell wt. (g) | Wt % FeS$_2$ | Loading (mg/cm$^2$) | Density (% solids) | Anode Thickness | Electrolyte (molal) | PTC (mΩ/cm) | Constant Power (1000 mW) | |
|---|---|---|---|---|---|---|---|---|---|
| | | | | | | | | mWh | Wh/kg |
| A | 14.69 | 92.0 | 21.77 | 66 | 150 μm | 0.75 m | 36 | 3715 | 253 |
| B | 14.78 | 96.5 | 24.4 | 60 | 175 μm | 0.75 m | 36 | 4138 | 280 |
| C | 14.70 | 96.5 | 24.4 | 60 | 175 μm | 0.75 m | 36 | 4114 | 280 |
| D | 14.70 | 96.5 | 24.4 | 60 | 175 μm | 0.75 m | 18 | 4185 | 285 |
| E | 14.43 | 96.7 | 24.4 | 60 | 175 μm | 0.75 m | 18 | 4157 | 288 |
| F | 14.79 | 96.5 | 24.4 | 60 | 175 μm | 1 m | 36 | 4292 | 290 |
| G | 14.58 | 96.5 | 24.4 | 60 | 175 μm | 1 m | 18 | 4323 | 297 |
| H | 14.72 | 96.7 | 24.4 | 60 | 175 μm | 1 m | 18 | 4330 | 294 |

In Table 5, the '360 example is represented by formulation A, wherein the cathode comprised 92.0 wt. % pyrite. This formulation showed the ability to produce an average of 3715 mWh for a single FR6 cell. With an average cell weight of 14.69 g, the average energy output for a 92.0 wt. % pyrite cell was 253 Wh/kg, under constant power drain conditions. As discussed with Table 3 above, the remainder of the formulations represent different variations of electrolyte cells centered around the cathode formulations described in Examples 1 and 2 (i.e. 96.5 and 96.7 wt. % pyrite).

The performance of the electrochemical cells at higher pyrite loadings was noticeable over formulation A. There was an increase in performance by at least 399 mWh, and upwards of 615 mWh for a single FR6 cell. In terms of Wh/kg, the performance improvement for the cells ranged between 27 and 44 Wh/kg. The pyrite formulations with 96.7 wt. % performed slightly better than similar cells with 96.5 wt. % pyrite. Additionally, a higher concentration of electrolyte and reduction in PTC resistance helped performance slightly as well. This represents an output performance improvement of approximately 11-17% for the constant power drain test.

In reviewing the information in Tables 2a, 2b, 3, 4, and 5, it becomes clear that there are significant improvements in active pyrite volume percentage, mWh and Wh/kg of cathode and reduction of non-electrochemically active components that can be realized by the present invention. Moreover, the cell achieves greater capacity than previous designs, and it is possible to design, for instance, a functional FR6 cell using a 10 mil CRS container with more than 1 g of lithium that can discharge essentially all of the lithium without having the reaction products split the container (or otherwise cause a mechanical failure of the cell). As such, this represents a significant improvement that was not expected or reasonably possible through the use of previously known technologies.

The above description is particularly relevant to cylindrical Li/FeS$_2$ cells, including but not limited to FR6 and FR03 types, as defined in International Standards IEC 60086-1 and IEC 60086-2, published by the International Electrotechnical Commission, Geneva, Switzerland. However, the invention may also be adapted to other cylindrical cell sizes where the sidewall height exceeds the diameter of the container, cells with other cathode coating schemes and/or seal and/or pressure relief vent designs.

Features of the invention and its advantages will be further appreciated by those practicing the invention. Furthermore, certain embodiments of the components and the performance of the cell assembled as described will be realized.

In the same manner, it will be understood by those who practice the invention and those skilled in the art that various modifications and improvements may be made to the invention without departing from the spirit of the disclosed concepts. The scope of protection afforded is to be determined by the claims and by the breadth of interpretation allowed by law.

I claim:

1. A battery comprising:
   a. a jellyroll electrode assembly comprising an anode consisting essentially of lithium or a lithium alloy without the use of a separate current collector, a microporous separator having a thickness between 16 and 22 microns, and a cathode comprising a cathode dry mix coated onto at least one side of a current collector, said coating having a thickness, exclusive of the current collector, between 80 microns and 102 microns and a void volume, exclusive of the current collector, between 28% and 40%, said cathode dry mix comprising at least one binder, at least one conductor, at least one processing aid and between 95-98 wt. % of pyrite having at least 95 wt. % of iron disulfide, and said cathode dry mix further having a cathode dry mix density of at least 4.35 g/cc and a cathode loading, after coating and densification on the current collector, of at least 24 mg/cm$^2$;
   b. an organic electrolyte comprising 1,3-dioxolane and 1,2-dimethoxyethane;
   c. a cylindrical container having a yield strength, a height and a diameter, said height exceeding the diameter of the container; and
   d. wherein, under any discharge condition, the jellyroll electrode assembly exerts between greater than 50% but no more than 80% of the yield strength of the container.

2. The battery of claim 1, wherein the battery has a capacity of at least 4000 mAh at 200 mA continuous drain for a FR6 battery.

3. The battery of claim 1, wherein the coating comprises less than 2 wt. % conductor.

4. The battery of claim 3, wherein the coating comprises 2 wt. % or less of binder, processing aid, or combination thereof.

5. The battery of claim 1, wherein the cylindrical container is formed from cold rolled steel.

6. The battery of claim 5, wherein the cylindrical container has a wall with a thickness between 7-10 mils when the cell is an FR6 cell.

* * * * *